US009897692B2

(12) United States Patent
Ohtsu et al.

(10) Patent No.: US 9,897,692 B2
(45) Date of Patent: Feb. 20, 2018

(54) ELECTROMAGNETIC CLOAKING STRUCTURE AND METHOD FOR MANUFACTURING THE SAME

(71) Applicant: FUJIFILM Corporation, Tokyo (JP)

(72) Inventors: Akihiko Ohtsu, Ashigarakami-gun (JP); Hideki Yasuda, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/452,969

(22) Filed: Mar. 8, 2017

(65) Prior Publication Data

US 2017/0176580 A1 Jun. 22, 2017

Related U.S. Application Data

(63) Continuation of application No. PCT/JP2015/004429, filed on Aug. 31, 2015.

(30) Foreign Application Priority Data

Sep. 22, 2014 (JP) .................................. 2014-192386

(51) Int. Cl.
*G01S 7/495* (2006.01)
*G01S 7/38* (2006.01)
(Continued)

(52) U.S. Cl.
CPC ............. *G01S 7/495* (2013.01); *F41H 3/00* (2013.01); *G01S 7/38* (2013.01); *G02B 1/002* (2013.01)

(58) Field of Classification Search
CPC . G01S 7/495; G01S 7/38; G02B 1/002; F41H 3/00
(Continued)

(56) References Cited

U.S. PATENT DOCUMENTS

2008/0024792 A1 1/2008 Pendry et al.
2010/0110559 A1 5/2010 Cai et al.
(Continued)

FOREIGN PATENT DOCUMENTS

JP 2008-023517 A 2/2008
WO WO 2010/140655 A1 12/2010

OTHER PUBLICATIONS

International Search Report (PCT/ISA/210) issued in PCT/JP2015/004429, dated Jan. 12, 2016.
(Continued)

*Primary Examiner* — Nicole Ippolito
*Assistant Examiner* — Hanway Chang
(74) *Attorney, Agent, or Firm* — Birch, Stewart, Kolasch & Birch, LLP

(57) ABSTRACT

In an electromagnetic cloaking structure, a refractive index distribution has a high refractive index region which is provided around a shielding space and has a maximum value in a plane surrounding the shielding space and in which a refractive index decreases gradually from the centroid of the shielding space along a radial line passing through the plane so as to be close to an average refractive index and a low refractive index region which has a minimum value at two points having the shielding space and the high refractive index region interposed therebetween on a virtual optical axis passing through the shielding space and in which the refractive index increases gradually from the two points in a direction opposite to the high refractive index region on the virtual optical axes, on which the two points are placed, so as to be close to the average refractive index.

13 Claims, 15 Drawing Sheets

(51) Int. Cl.
G02B 1/00 (2006.01)
F41H 3/00 (2006.01)
(58) Field of Classification Search
USPC .......................................... 250/505.1, 515.1
See application file for complete search history.

(56) References Cited

U.S. PATENT DOCUMENTS

2011/0085229 A1   4/2011   Lavrentovich et al.
2012/0105970 A1   5/2012   Ueda

OTHER PUBLICATIONS

Leonhardt, Ulf, "Optical Conformal Mapping", Science, vol. 312, Issue 5781, Jun. 23, 2006, pp. 1777-1780.
Li et al., "Hiding under the Carpet: A New Strategy for Cloaking", Physical Review Letters, vol. 101, No. 203901, Nov. 10, 2008, pp. 203901-1-203901-4.
Ma et al., "First experimental demonstration of an isotropic electromagnetic cloak with strict conformal mapping", Scientific Reports, vol. 3, No. 2185, Jul. 15, 2013, pp. 1-5.
Written Opinion (PCT/ISA/237) issued in PCT/JP2015/004429, dated Jan. 12, 2016.

ELECTROMAGNETIC CLOAKING STRUCTURE AND METHOD FOR MANUFACTURING THE SAME

CROSS REFERENCE TO RELATED APPLICATIONS

The present application is a Continuation of PCT International Application No. PCT/JP2015/004429 filed on Aug. 31, 2015, which claims priority under 35 U.S.C. § 119(a) to Japanese Patent Application No. 2014-192386 filed on Sep. 22, 2014. Each of the above applications is hereby expressly incorporated by reference, in its entirety, into the present application.

BACKGROUND OF THE INVENTION

1. Field of the Invention

The present invention relates to a technique that shields an object and some space volume from an external observer so as not to be detected, and more particularly, to an electromagnetic cloaking structure and a method for manufacturing the same.

2. Description of the Related Art

There are many reports on attempts to shield an object from electromagnetic waves (including visible light). The observer detects a target object, using disturbance in electromagnetic waves caused by the scattering, reflection, or absorption of the electromagnetic waves which are incident on the target object. For example, stealth technology or a low radar cross-section structure has been known as a method for preventing the detection. As another method, for example, a method has been known which controls the material parameters of a space such that electromagnetic waves travel around the target object to be shielded.

For example, JP2008-23517A discloses an electromagnetic cloaking method which constructs a plurality of shielding volume elements around volume that can be shielded and uses anisotropic material parameters as the volume elements.

J. Li et al., "Hiding under the Carpet: A New Strategy for Cloaking" Physical Review Letters, 101, 203901, 2008 discloses a method that makes an object invisible, using quasi-conformal mapping, an isotropic medium, and reflective cloaking. However, this technique relates to reflective cloaking and does not disclose transmissive cloaking. In addition, U. Leonhardt, "Optical Conformal Mapping", Science, Vol. 312, p. 1777, 2006 and Y. Ma et al., "First experimental demonstration of an isotropic electromagnetic cloak with strict conformal mapping", Scientific Report, 02182, 2013 disclose a technique that can make an object invisible, using quasi-conformal mapping, an isotropic medium, and transmissive cloaking.

SUMMARY OF THE INVENTION

However, in the method disclosed in JP2008-23517A, anisotropic material parameters are essential. It is difficult to produce the anisotropic material parameters using the current technique. In particular, in a case in which cloaking is performed in a visible range, it is necessary to manufacture a cubic and complicated nanometer-order structure. Therefore, it is difficult to achieve the structure, using the current leading-edge semiconductor process technique.

U. Leonhardt, "Optical Conformal Mapping", Science, Vol. 312, p. 1777, 2006 and Y. Ma et al., "First experimental demonstration of an isotropic electromagnetic cloak with strict conformal mapping", Scientific Report, 02182, 2013 disclose the possibility of transmissive cloaking. However, a refractive index distribution structure in which both a medium with a low refractive index and a medium with a high refractive index come into contact with the periphery of a target object to be shielded is essential. It is necessary to manufacture the structure in which both the medium with a low refractive index and the medium with a high refractive index are disposed around the target object.

The invention has been made in view of the above-mentioned problems and an object of the invention is to provide a feasible transmissive cloaking structure.

A first electromagnetic cloaking structure according to the invention includes a shielding space for accommodating a target object to be shielded from electromagnetic waves and has a refractive index distribution around the shielding space. An entire medium including a base medium which forms the structure has an isotropic refractive index. In a case where an average of a maximum value and a minimum value in the refractive index distribution is an average refractive index, the refractive index distribution has a high refractive index region with a relatively high refractive index which is provided around the shielding space and has the maximum value in a plane surrounding the shielding space and in which the refractive index decreases gradually from a centroid of the shielding space along a radial line passing through the plane so as to be close to the average refractive index and a low refractive index region with a relatively low refractive index which has the minimum value at two points having the shielding space and the high refractive index region interposed therebetween on one virtual optical axis or two different virtual optical axes passing through the shielding space and in which the refractive index increases gradually from the two points in a direction opposite to the high refractive index region on the virtual optical axes, on which the two points are placed, so as to be close to the average refractive index.

Preferably, the two points in the low refractive index region are placed on the same virtual optical axis passing through the centroid of the shielding space.

A second electromagnetic cloaking structure according to the invention has a refractive index distribution that is disposed only on an incident side of electromagnetic waves with respect to a plane in which an incident direction of the electromagnetic waves on a target object to be shielded from the electromagnetic waves is a normal vector. An entire medium including a base medium which forms the structure has an isotropic refractive index. In a case where an average of a maximum value and a minimum value in the refractive index distribution is an average refractive index, the refractive index distribution comprises a region which has the maximum value in an outermost surface on the side of the target object to be shielded, a high refractive index region with a relatively high refractive index in which the refractive index decreases gradually from a center of the outermost surface of the region having the maximum value along a radial line so as to be close to the average refractive index and a low refractive index region with a relatively low refractive index which has the minimum value on an incident side of the electromagnetic waves on the high refractive index region and in which the refractive index increases gradually toward the incident side so as to be close to the average refractive index.

Here, the relatively high refractive index or the relatively low refractive index is defined on the basis of the average refractive index and means a refractive index higher than the average refractive index or a refractive index lower than the average refractive index.

The case in which the refractive index "decreases gradually" or "increases gradually" includes a case in which the refractive index changes continuously and a case in which the refractive index changes discontinuously (in stages).

In the first and second electromagnetic cloaking structures according to the invention, a rate of addition of at least one medium, which has a refractive index different from that of the base medium, to the base medium may be modulated to form the refractive index distribution.

The at least one medium may be added as a structure with a size that is equal to or less than half of a wavelength of the electromagnetic waves to the base medium (base material). In the refractive index distribution, the size of the structures which are periodically arranged in the base medium at an interval that is equal to or less than half of the wavelength of the electromagnetic waves may be changed, depending on an arrangement position, to modulate the rate of addition. In addition, the density of the structures arranged in the base medium may be changed to modulate the rate of addition.

The shape of the structure is not particularly limited. The structure has various shapes such as a spherical particle, a disk, a wire, a line, a rectangular parallelepiped dot, or a cubic dot. It is assumed that the size of the structure is the distance between the position of the centroid of the structure and a point on a surface that is farthest from the position of the centroid. In addition, the gap between the structures arranged in the base medium at the interval that is equal to or less than half of the wavelength may be changed to modulate the rate of addition. It is assumed that the gap (hereinafter, referred to as an interval) between the structures is the distance between the positions of the centroids of the structures adjacent to each other.

In the microscopic sense, the base medium and the structure have different refractive indices. However, when the structure is considered to have some width, the refractive index of the space can be regarded as the refractive index corresponding to the proportion of the structure to the base medium. When the size of the structure and the arrangement interval between the structures is equal to or less than half of the wavelength of the electromagnetic waves, the refractive index of the space is regarded as the refractive index corresponding to the ratio of the structure to the base medium, according to electromagnetic waves. The size of the structure and the arrangement interval between the structures are preferably equal to or less than one fifth of the wavelength of target electromagnetic waves and more preferably equal to or less than one tenth of the wavelength.

A method for manufacturing an electromagnetic cloaking structure according to the invention comprises: determining a shape of a shielding space; assuming that an incident direction of electromagnetic waves on the shielding space is a z-axis direction, a centroid of the shielding space is the origin of the shielding space, and slits are provided in a positive region and a negative region of the z-axis direction passing through the origin, acquiring a conformal mapping function for coordinate conversion from an original coordinate system in which a refractive index distribution has been known to a coordinate system including the shielding space and the slits; calculating a refractive index distribution in the coordinate system including the shielding space from the refractive index distribution of the original coordinate system and a derivative of the conformal mapping function; and manufacturing the electromagnetic cloaking structure that includes the shielding space and has the refractive index distribution around the shielding space.

In the first and second electromagnetic cloaking structures according to the invention, the entire medium including the base medium has an isotropic refractive index. Therefore, it is easier to achieve the first and second electromagnetic cloaking structures than the cloaking method disclosed in JP2008-23517A in which the isotropic parameters are essential. In addition, all of the planes that come into contact with the shielding space have the maximum refractive index. Therefore, it is easier to manufacture the first and second electromagnetic cloaking structures than the optical design (refractive index distribution) according to the related art disclosed in U. Leonhardt, "Optical Conformal Mapping", Science, Vol. 312, p. 1777, 2006 and Y. Ma et al., "First experimental demonstration of an isotropic electromagnetic cloak with strict conformal mapping", Scientific Report, 02182, 2013 in which a mixture of a region with a high refractive index and a region with a low refractive index needs to be provided in the plane that comes into contact with the shielding space.

DESCRIPTION OF THE PREFERRED EMBODIMENTS

Hereinafter, an electromagnetic cloaking structure according to an embodiment of the invention will be described with reference to the drawings.

Figure 1:
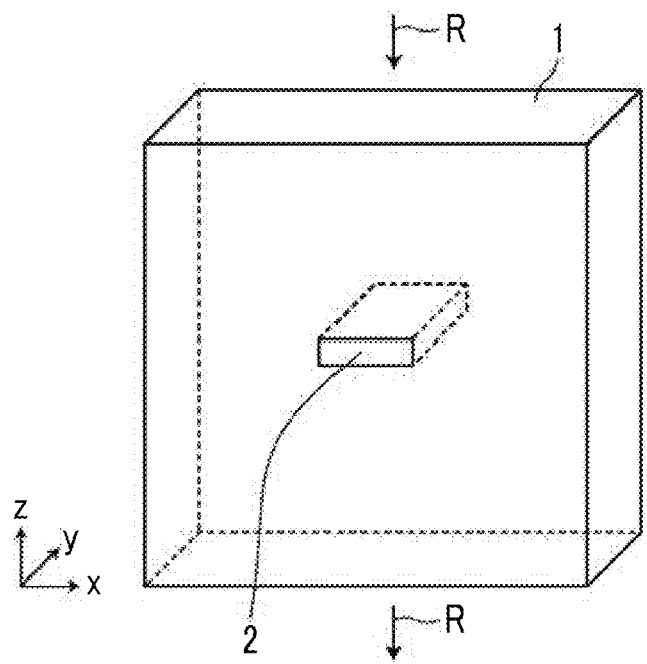
FIG. 1 is a perspective view illustrating an electromagnetic cloaking structure according to a first embodiment.

FIG. 1 is a perspective view illustrating an electromagnetic cloaking structure 1 according to a first embodiment. The electromagnetic cloaking structure 1 includes a shielding space 2 for accommodating a target object to be shielded from electromagnetic waves and has a refractive index distribution around the shielding space 2. Here, the electromagnetic cloaking structure 1 has a rectangular parallelepiped shape.

The entire medium including a base medium which forms the structure 1 has an isotropic refractive index.

Figure 2A:
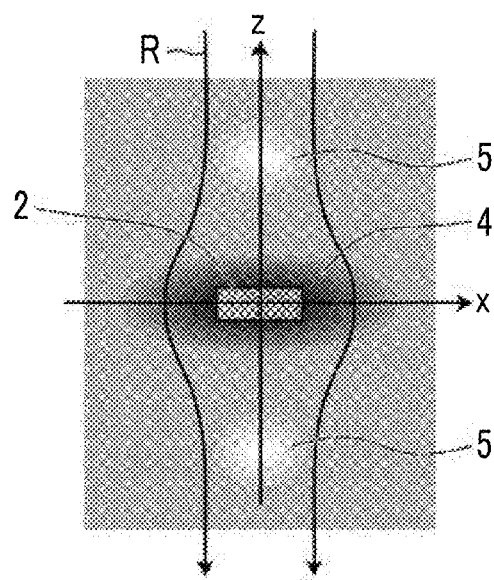
FIG. 2A is a diagram schematically illustrating a refractive index distribution of an electromagnetic cloaking structure 1 in the xz cross-section.
Figure 2B:
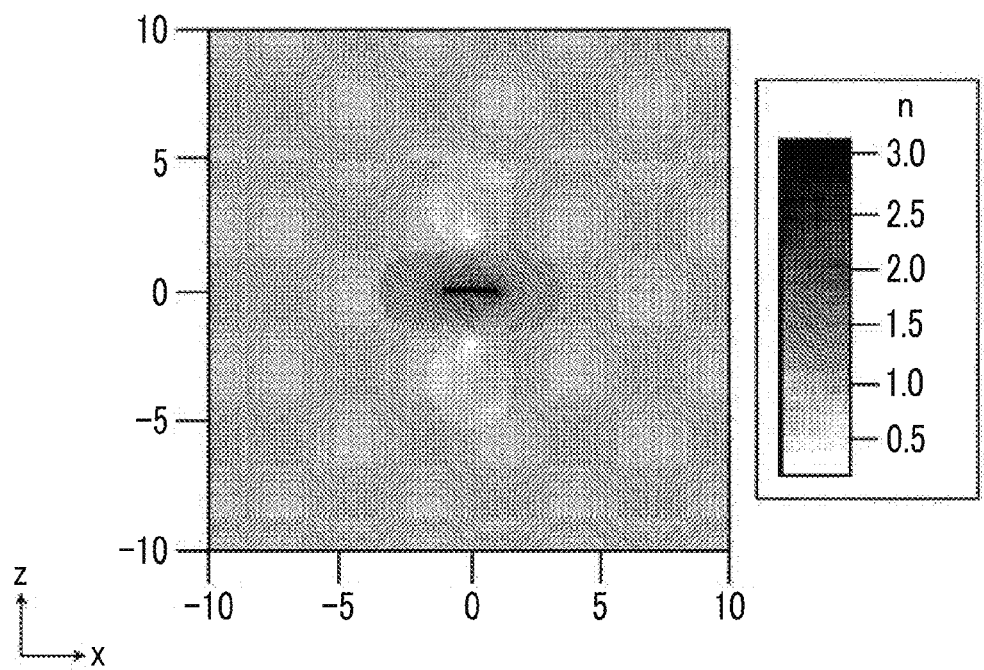
FIG. 2B is a diagram illustrating the simulation result of the refractive index distribution of the electromagnetic cloaking structure 1 in the xz cross-section.

FIG. 2A is a diagram schematically illustrating the refractive index distribution of the structure 1 in an xz cross-section and FIG. 2B is a diagram illustrating the simulation result of the refractive index distribution of the structure 1 in the xz cross-section.

As illustrated in FIGS. 2A and 2B, in a case where the average of a maximum value and a minimum value in the refractive index distribution is an average refractive index, the refractive index distribution around the shielding space 2 has a high refractive index region 4 with a relatively high refractive index in which the refractive index is the maximum in a plane surrounding the shielding space 2 and decreases gradually the centroid of the shielding space 2 along a radial line passing through the plane so as to be close to the average refractive index and a low refractive index region 5 with a relatively low refractive index which has the minimum value at two points having the shielding space 2 and the high refractive index region 4 interposed therebetween on a virtual optical axis (here, the z-axis) passing through the centroid of the shielding space 2 in which the refractive index increases gradually from the two points in a direction opposite to the high refractive index region 4 on the virtual optical axis so as to be close to the average refractive index.

In FIG. 2A, brightness decreases (dark) as the refractive index increases and increases (light) as the refractive index decreases.

In the high refractive index region 4, a portion that comes into contact with the shielding space 2 has the highest refractive index. The refractive index of the high refractive index region 4 decreases gradually so as to be close to the average refractive index as the distance from the shielding space 2 increases. The refractive index may change continuously or discontinuously.

The low refractive index region 5 is disposed at a position separated from the shielding space 2 on the virtual optical axis so as to have the minimum refractive index. Here, the virtual optical axis is an optical axis which is a traveling direction in which the electromagnetic waves to be shielded are incident on the shielding space 2. The low refractive index region 5 has a refractive index distribution in which the refractive index increases gradually from at least a point with the minimum refractive index in the direction opposite to the high refractive index region 4 on the virtual optical axis so as to be close to the average refractive index. The low refractive index region 5 may have a region in which the refractive index increases gradually toward the high refractive index region 4. In addition, two low refractive index regions 5 provided on both sides of the shielding space 2 may be symmetric with respect to the centroid of the shielding space 2 or may not be symmetric. That is, the distances of the two low refractive index regions 5 from the shielding space 2 may be equal to each other or may be different from each other.

Since the structure has the refractive index distribution, as illustrated in FIG. 2A, electromagnetic waves R that are incident on the electromagnetic cloaking structure 1 in the z-axis direction travel around the shielding space 2 and are emitted from the structure 1 along the same axis as the incident axis.

A method for manufacturing the electromagnetic cloaking structure 1 will be described.

Figure 3:
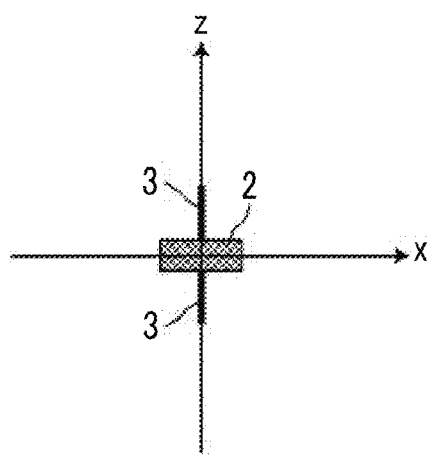
FIG. 3 is a diagram illustrating a shielding space having a rectangular shape in a cross-section which is assumed in the first embodiment.
Figure 4:
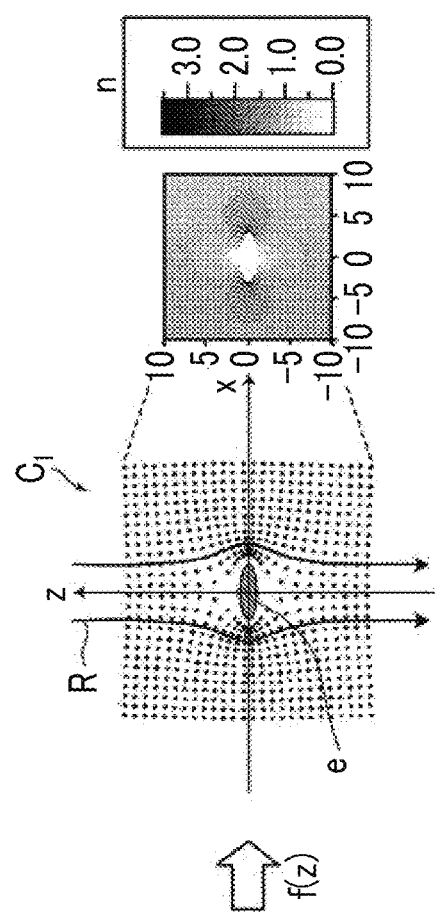
FIG. 4 is a diagram illustrating a coordinate conversion method using a conformal mapping function.
Figure 4:
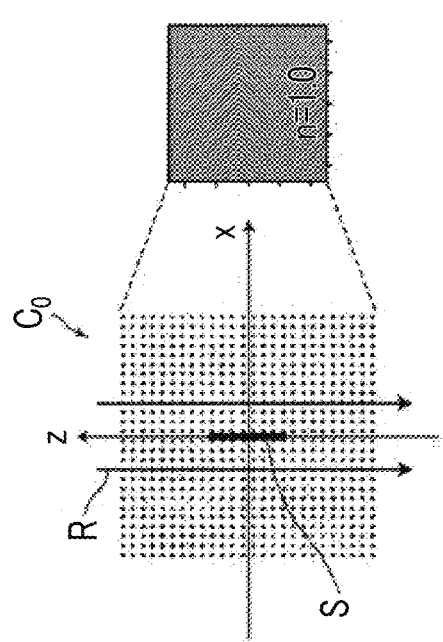

FIG. 3 illustrates the shielding space 2 that is assumed in order to design the refractive index distribution of the electromagnetic cloaking structure 1 illustrated in FIG. 1. First, the basic idea of designing the refractive index distribution using a mathematical method will be described with reference to FIG. 4. In the invention, the refractive index distribution around the shielding space is calculated using a mathematical method for converting a predetermined space into a conformal mapping space using a conformal mapping theory. This idea has been applied to U. Leonhardt, "Optical Conformal Mapping", Science, Vol. 312, p. 1777, 2006 and Y. Ma et al., "First experimental demonstration of an isotropic electromagnetic cloak with strict conformal mapping", Scientific Report, 02182, 2013. FIG. 4 is based on the method according to the related art.

FIG. 4 illustrating a coordinate system and a refractive index distribution before coordinate conversion using a conformal mapping function (left diagram) and after coordinate conversion using the conformal mapping function (right diagram). Here, a two-dimensional model will be described for ease of explanation.

As illustrated in the left diagram of FIG. 4, a slit S is inserted into a portion of the original coordinate system $C_0$ of a medium with a refractive index $n_{initial}$ and the slit S is widened to form a shielding space (shielding region) e. In this way, a coordinate system $C_1$ having the shielding space e illustrated in the right diagram of FIG. 4 is formed. When the slit S is widened to form the coordinate system $C_1$ having the shielding space e, the coordinates of dots (points) which are arranged in the xz plane of the left diagram illustrated in FIG. 4 are changed around the shielding space e in the xz plane of the right diagram such that the dots are sparsely and densely arranged. A conformal mapping function f(w) for coordinate conversion from the original coordinate system $C_0$ to the coordinate system $C_1$ having the shielding space e can be mathematically calculated. A refractive index distribution $n(f(w))$ in the coordinate system $C_1$ having the shielding space is given as follows:

$$n(f(w))=n_{initial}/|df/dw|, w=x+iz.$$

In the original coordinate system $C_0$ illustrated in the left diagram of FIG. 4, the refractive index $n_{initial}$ is 1 and is uniform in a target space. The refractive index distribution in the coordinate system $C_1$ illustrated in the right diagram which is calculated from the derivative of the conformal mapping function $f(w)$ has high refractive index regions that come into contact with the left and right sides (x direction) of the shielding space e and low refractive index regions that come into contact with the upper and lower sides (z direction) of the shielding space e.

Figure 5A:
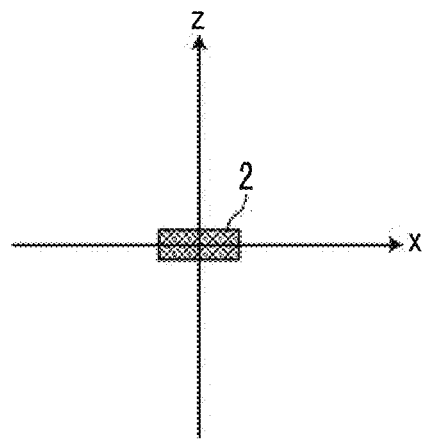
FIG. 5A is a diagram illustrating a shielding space having a rectangular shape in a cross-section which is assumed in the related art.
Figure 5B:
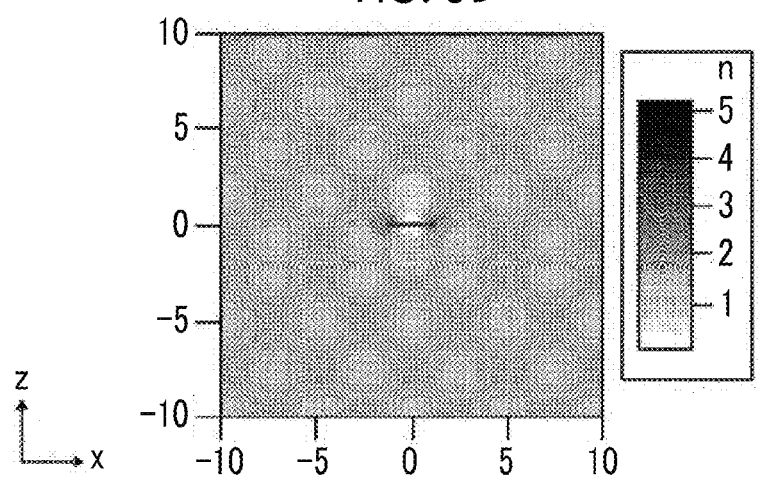
FIG. 5B is a diagram illustrating a refractive index distribution in the case of coordinate conversion when the shielding space illustrated in FIG. 5A is assumed.
Figure 5B:
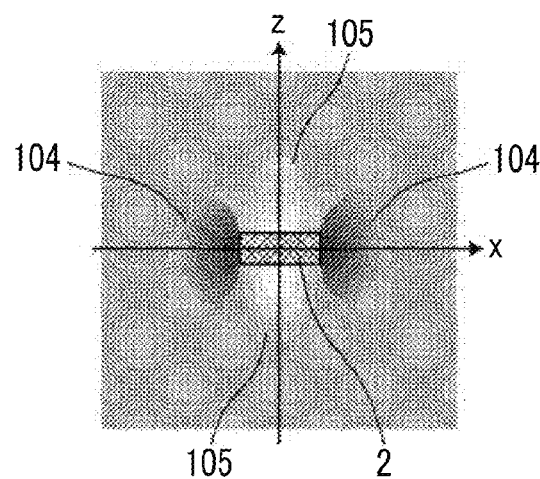

In a case in which a shielding space 2 having a rectangular shape in the xz plane illustrated in FIG. 5A is assumed, a refractive index distribution illustrated in the upper diagram of FIG. 5B is calculated by the above-mentioned method. The lower diagram of FIG. 5B schematically illustrates the refractive index distribution illustrated in the upper diagram. As illustrated in FIG. 5B, even in a case in which the rectangular shielding space 2 is assumed, the structure has high refractive index regions 104 that come into contact with the left and right sides (x direction) of the shielding space 2 and low refractive index regions 105 that come into contact with the upper and lower sides (z direction) of the shielding space 2, similarly to the case of an elliptical shielding space.

In practice, it is very difficult to achieve the structure in which the region that comes into contact with the shielding space 2 illustrated in FIG. 4 or FIG. 5B has the high refractive index region and the low refractive index region at the same time.

The method according to the invention differs from the method according to the related art in that slits are provided on both sides of the shielding space in the z-axis direction when the shape of a desired shielding space in the coordinate system after coordinate conversion is determined.

Similarly to the method according to the related art, a two-dimensional model will be described for ease of explanation. It is assumed that the shielding space (shielding region) 2 having a rectangular shape in the xz plane is a desired shielding space (see FIG. 3). In this case, it is assumed that the incident direction of electromagnetic waves on the shielding space 2 is the z-axis direction and slits 3 are provided on both sides of the shielding space 2 in the z-axis direction passing through the centroid of the shielding space 2, as illustrated in FIG. 3. In this case, the conformal mapping function $f(w)$ for coordinate conversion from the original coordinate system of which the refractive index distribution has been known to a coordinate system including the shielding space 2 and the slits 3 is acquired. Then, a refractive index distribution (see FIG. 2B) in the coordinate system having the shielding space is calculated from the refractive index of the original coordinate system and the derivative of the conformal mapping function. It is easy to calculate the refractive index distribution in the original coordinate system since the refractive index is uniform and is n=1. In the case of a two-dimensional model, the conformal mapping function $f(w)$ can be calculated by a numerical calculation method, such as a "charge simulation method", when the values of a plurality of points in the entire range of a boundary "line" between the shielding space and the electromagnetic cloaking structure are known.

Then, an electromagnetic cloaking structure that has the shielding space 2 provided therein and has the above-mentioned refractive index distribution around the shielding space 2 is manufactured.

The refractive index distribution in the two-dimensional plane (xz plane) has been described above for ease of explanation. However, in the case of a cubic structure, similarly, a slit (which may be considered as a line here) may extend from the surface of the shielding space in the cube in the optical axis direction and a conformal mapping function may be calculated. When the values of a plurality of points on a boundary surface of the shielding space are acquired, it is possible to mechanically obtain the conformal mapping function $f(w)$ for coordinate conversion, using a numerical calculation method, such as the "charge simulation method", in the subsequent process.

Figure 6A:
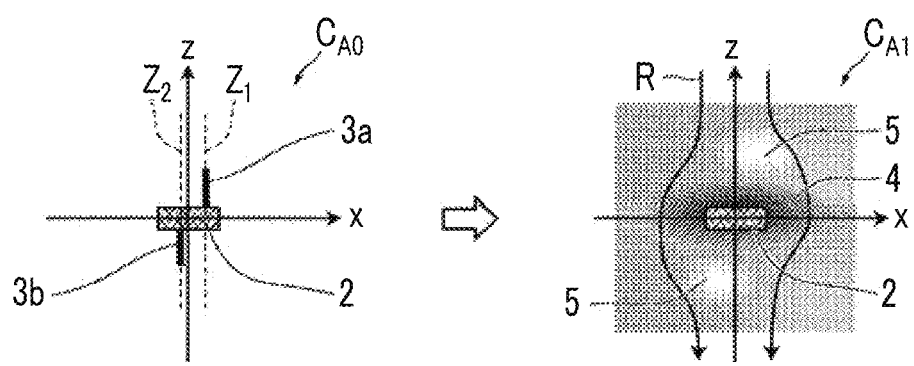
FIG. 6A is a diagram illustrating a modification example of the first embodiment.

In the above-described embodiment, the low refractive index region 5 has the minimum value on the z-axis. However, the low refractive index region 5 may not have the minimum value on the z-axis as long as the shielding space 2 can be shielded. In this embodiment, it is assumed that the slits 3 are provided on the upper and lower sides of the z-axis passing through the centroid of the shielding space 2 in the converted coordinate system comprising a desired shielding space, as illustrated in FIG. 3. However, it may be assumed that slits 3a and 3b extend to the positive and negative sides of two virtual optical axes $z_1$ and $z_2$ which do not pass through the centroid of the shielding space 2, respectively, as illustrated in the left diagram of FIG. 6A. In this case, when a conformal mapping function is calculated to calculate a refractive index distribution, a refractive index distribution comprising low refractive index regions 5 that have one minimum refractive index in each of a positive region and a negative region in the z-axis direction, between which the shielding space 2 and the high refractive index region 4 around the shielding space 2 are interposed, as illustrated in the right diagram of FIG. 6A is obtained. In this case, the electromagnetic waves R that are incident along the z-axis travel around the shielding space 2 and are then emitted by the influence of the low refractive index regions 5 and the high refractive index region 4.

In FIG. 3, it is preferable that the length Ls of the slit 3 is large assuming that the slit 3 extends from the surface of the shielding space 2 in the z-axis direction.

Figure 6B:
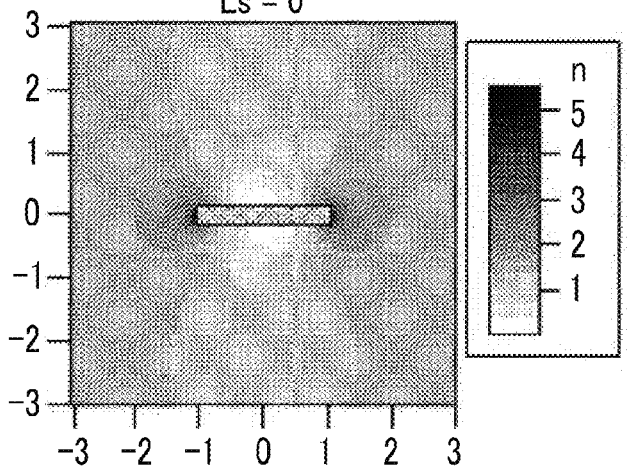
FIG. 6B is a diagram illustrating a refractive index distribution that depends on whether a slit is provided and the length of the slit in a coordinate system including an assumed shielding space.
Figure 6B:
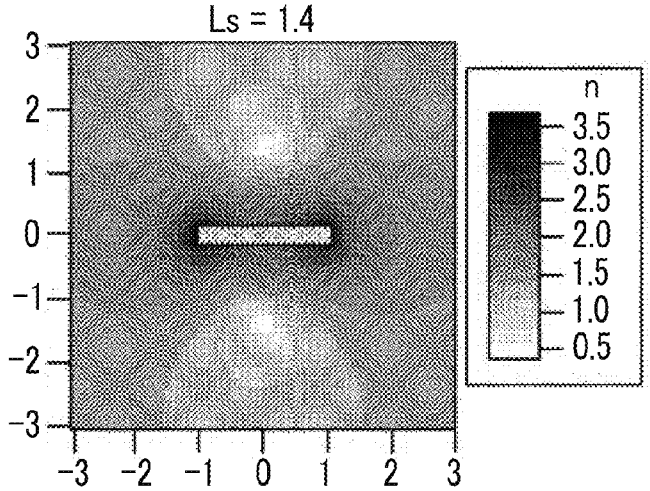
Figure 6B:
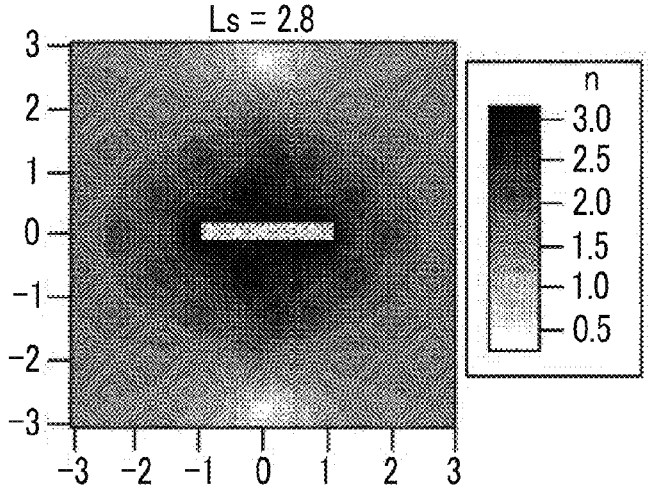

FIG. 6B illustrates a refractive index distribution which is calculated by simulations assuming that a slit 3 with a length Ls of 0 (this is a state in which no slit is provided as in the related art) (a in FIG. 6B), a slit with a length Ls of 1.4 (b in FIG. 6B), and a slit with a length Ls of 2.8 (c in FIG. 6B) are provided with respect to the shielding space 2. The case in which Ls is 0 is the same as that described in FIG. 5B. In this case, the cloaking structure has a refractive index distribution in which the maximum refractive index region and the minimum refractive index region are adjacent to the shielding space at the same time. When Ls is 1.4, the maximum refractive index region comes into contact with the shielding space and the minimum refractive index region is separated from the shielding space. Since a refractive index difference in the plane that comes into contact with the shielding space is significantly less than that in the case of Ls=0, the cloaking structure can be manufactured. In the case of Ls=2.8, all of the regions that come into contact with the shielding space in the cloaking structure have the maximum refractive index. Therefore, it is easy to manufacture the cloaking structure, which is preferable.

In the above-described embodiment, the shielding space has a rectangular parallelepiped shape. However, the shielding space may have any shape. In this case, a slit can be provided according to an assumed shape, a conformal mapping function can be calculated, and a refractive index distribution can be calculated.

Figure 6C:
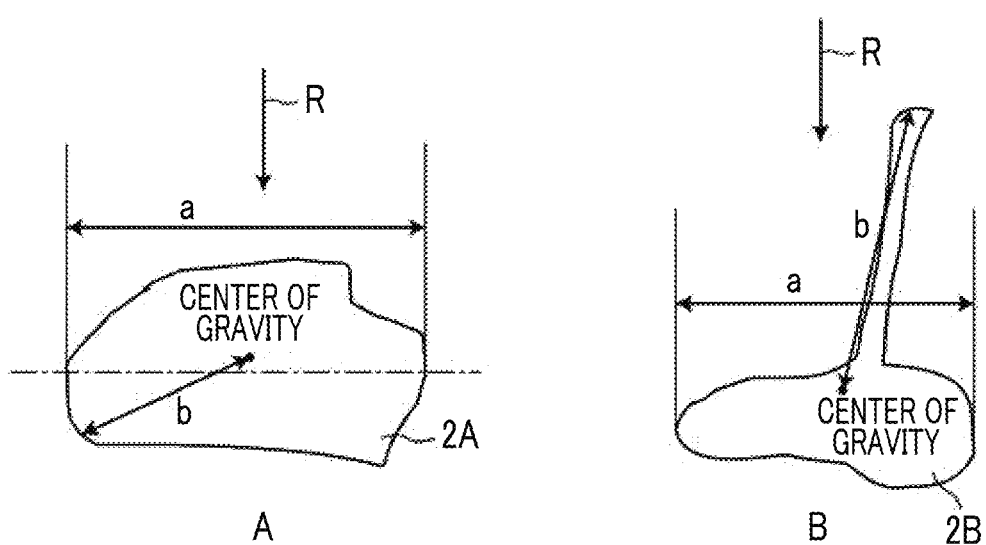
FIG. 6C is a diagram illustrating a shielding space and the preferred length of a slit.

For example, shielding spaces 2A and 2B having a flat shape or an unusual shape illustrated in A and B of FIG. 6C may be provided. When a slit is assumed in the shielding space having an unusual shape, it is preferable that the distance (shortest distance) between the leading end of the slit (a portion of the slit which is farthest from the shielding space) and the shielding space is set to be greater than the larger of the maximum value a of the cross-sectional length of the shielding space in the plane perpendicular to the optical axis in which the electromagnetic waves R travel (hereinafter, referred to as "cross sectional length a") and the size b of the shielding space which is defined as the maximum value of the distance between the position of the centroid of the shielding space and the surface of the shielding space. In A of FIG. 6C, the cross-sectional length a is greater than the size b of the shielding space. Therefore, the distance between the leading end of the assumed slit and the shielding space is equal to or greater than the cross-sectional length a. Meanwhile, in B of FIG. 6C, the size b of the shielding space is greater than the cross-sectional length a. Therefore, it is preferable that the distance between the leading end of the assumed slit and the shielding space is equal to or greater than the size b.

The rate of addition of at least one medium with a refractive index different from that of the base medium to the base medium can be modulated to form the refractive index distribution of the electromagnetic cloaking structure 1.

When the proportion of the medium to be added to the base medium varies, the refractive index varies. Therefore, the proportion of the medium to be added to the base medium is changed at each position of the structure to form the refractive index distribution. Specifically, a structure, such as a spherical particle, a disk, a line, a rectangular parallelepiped dot, or a cubic dot, which is made of a medium with a refractive index different from that of the base medium is added to the base medium. The size of the structure or the interval between the structures is changed to change the proportion of the medium to be added to the base medium. As a result, it is possible to change the refractive index. In addition, a plurality of structures made of different media may be added to the base medium at the same time.

When the size of the structure or the interval between the structures is equal to or less than half of the wavelength of the electromagnetic waves, the refractive index of the space is regarded as the refractive index corresponds to the proportion of the structure to the base medium according to electromagnetic waves. Therefore, in a case in which the refractive index of the structure to be added is greater than the refractive index of the base medium, the size of the structure can increase to increase the refractive index. In addition, the density of the structures with a constant size can increase to increase the refractive index.

Figure 7A:
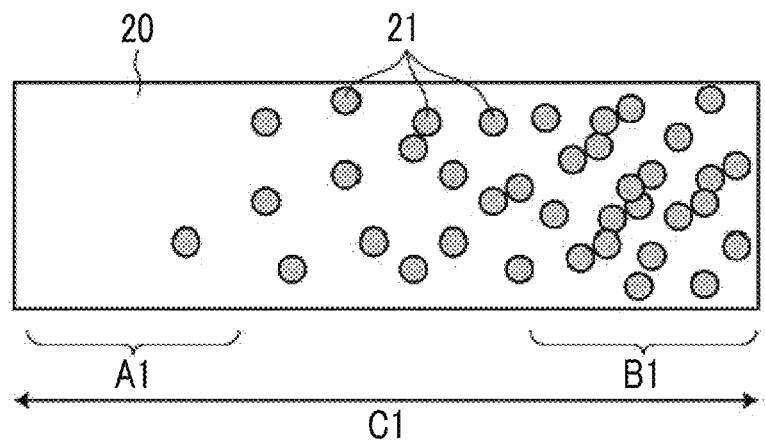
FIG. 7A is a diagram illustrating an example of a method for manufacturing a refractive index distribution structure.

For example, as illustrated in FIG. 7A, in a case in which spherical particles 21 that have a constant size and are made of a medium with a higher refractive index than the base medium 20 are added as the structure to the base medium 20, the addition density of the spherical particles 21 is changed in stages to change the refractive index in a region C1 in stages. Here, the refractive index of a region A1 with a low addition density is the relatively low refractive index and the refractive index of a region B1 with a high addition density is the relatively high refractive index.

Figure 7B:
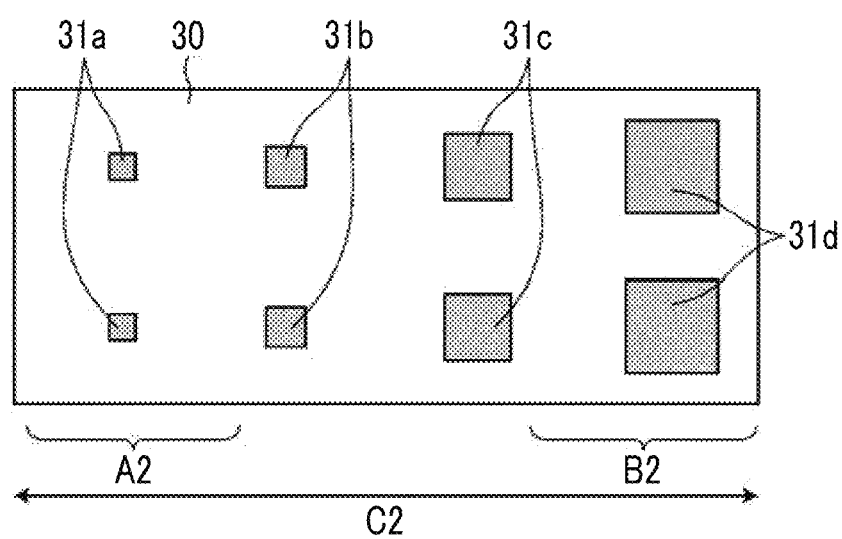
FIG. 7B is a diagram illustrating another example of the method for manufacturing the refractive index distribution structure.

As illustrated in FIG. 7B, in a case in which rectangular parallelepiped dots 31a to 31d that are made of a medium with a higher refractive index than a base medium 30 are periodically arranged as the structure at regular intervals in a predetermined direction (here, the left-right direction of FIG. 7B) in the base medium 30, the size of the rectangular parallelepiped dots 31a to 31d is sequentially changed to change the refractive index in a region C2. The refractive index of a region A2 in which small rectangular parallelepiped dots 31a are arranged is the relatively low refractive index and the refractive index of a region B2 in which large rectangular parallelepiped dots 31d are arranged is the relatively high refractive index. In this example, the rectangular parallelepiped dots 31a to 31d have a similar shape. However, the shape of the structure may be appropriately set according to a change in the desired refractive index.

In a case in which the refractive index of the structure to be added is less than the refractive index of the base medium, the size of the structure can decrease to reduce the refractive index. In addition, the density of the structure with a constant size can increase to decrease the refractive index.

The cloaking structure with respect to electromagnetic waves (light) in a visible range can be obtained by sequentially manufacturing nanostructures with a size of several tens of nanometers to several hundreds of nanometers using, for example, a microfabrication technique. For example, nanoparticles that are made of a medium with a refractive index different from that of the base medium are added as the structure to the base material forming the base medium and the density of the added nanoparticles or the material forming the nanoparticles is changed to manufacture a structure with a three-dimensional refractive index distribution. In addition, the structure with a three-dimensional refractive index distribution can be obtained by sequentially repeating a lithography process, a stacking process using deposition, and a back-filling and flattening process while changing the density of a two-dimensional pattern typified by semiconductor lithography.

In a case in which target electromagnetic waves are not in the visible range, but are in, for example, a radio range, it is also possible to manufacture the structure with a three-dimensional refractive index distribution, using, for example, a 3D printer.

It is preferable that a material that does not absorb or hardly absorbs electromagnetic waves in the wavelength range of target electromagnetic waves is selected as the material forming the base medium or the structure to be added. For example, for light with a wavelength of 555 nm, quartz, $MgF_2$, or a photoresist can be used as the base medium and $TiO_2$ or $ZrO_2$ can be used as the structure, in order to form the refractive index distribution. In addition, quartz can be selected as the base material and an aerial structure, such as air, can be selected as the structure, in order to form the refractive index distribution.

Figure 8A:
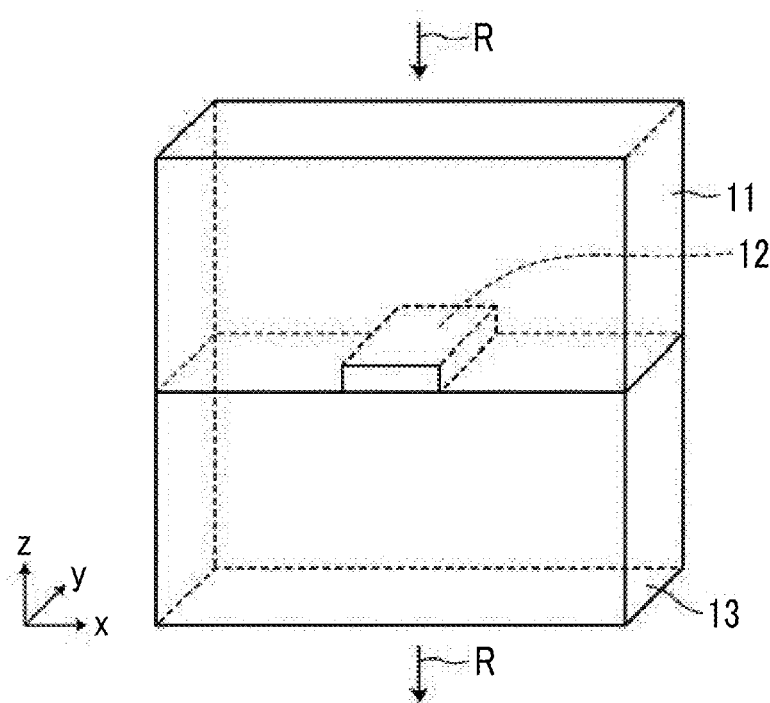
FIG. 8A is a perspective view illustrating an electromagnetic cloaking structure according to a second embodiment.

FIG. 8A is a perspective view illustrating an electromagnetic cloaking structure 11 according to a second embodiment.

The electromagnetic cloaking structure 11 has a refractive index distribution that is disposed only on the incident side of electromagnetic waves with respect to the plane in which the incident direction of the electromagnetic waves on a target object to be shielded from the electromagnetic waves is a normal vector. Here, the electromagnetic cloaking structure 11 has a substantially rectangular parallelepiped shape having a shielding space 12 on one surface. The electromagnetic cloaking structure 11 is provided on a substrate 13 such that the shielding space 12 is closed between the surface of the substrate 13 and the electromagnetic cloaking structure 11.

The entire medium including a base medium which forms the electromagnetic cloaking structure 11 has an isotropic refractive index.

Figure 8B:
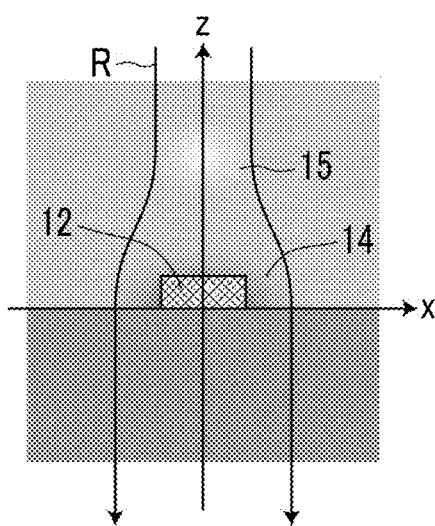
FIG. 8B is a diagram schematically illustrating a refractive index distribution of an electromagnetic cloaking structure in the xz cross-section.

FIG. 8B is a diagram schematically illustrating the refractive index distribution of the structure 1 in the xz cross-section.

As illustrated in FIG. 8B, the refractive index distribution comprises a region which has the maximum value in the outermost surface on the side of the target object to be shielded (here, a surface of the shielding space 12), a high refractive index region 14 which has a higher refractive index than the base medium and in which the refractive index decreases gradually from the center of the outermost surface of the region having the maximum value along a radial line, and a low refractive index region 15 which has the minimum value on the incident side of the electromagnetic waves on the high refractive index region 14 on a virtual optical axis (here, the z-axis) passing through the center and in which the refractive index increases gradually at least to the incident side on the virtual optical axis so as to be close to the refractive index of the base medium.

Since the structure has the above-mentioned refractive index distribution, electromagnetic waves R that are included on the cloaking structure 11 in the z-axis direction travel around the shielding space 12 and are then emitted to the substrate. In this structure, an object that is provided in the shielding space 12 is seen from the −z direction. However, since the electromagnetic waves R which are incident in the z-axis direction travel around the shielding space 12 and then travel in the −z direction, the object in the shielding space 12 is not seen from the z-axis direction.

As such, in a case in which the refractive index distribution is uniform in the −z direction, for example, the object is not detected form the z direction by a detection device that detects an object using the reflection of the electromagnetic waves R since the reflection of the electromagnetic waves R is suppressed. As a result, the cloaking performance is effective.

The low refractive index region is not necessarily provided on the z-axis and may be provided at a position that deviates from the z-axis to the x direction. In addition, the low refractive index region may be provided at any position as long as electromagnetic waves that are incident on the shielding space 12 in the z-axis direction can travel around the shielding space 12.

The electromagnetic cloaking structure 11 according to the second embodiment can be manufactured by the same method as the electromagnetic cloaking structure 1 according to the first embodiment.

That is, the shape of a desired shielding space is determined. It is assumed that a slit is provided in the shielding space along the z-axis direction. Then, a conformal mapping function for coordinate conversion from the original coordinate system is calculated and a refractive index distribution is calculated. A structure having a refractive index distribution on the +z side in the refractive index distribution illustrated in FIG. 2B may be manufactured.

EXAMPLES

Next, the evaluation result of the electromagnetic cloaking performance of the electromagnetic cloaking structure according to the invention will be described.

Example 1

(Optical Structure Design)

A model in which a shielding space with a rectangular parallelepiped shape having a long side length (x direction) of 2 μm, a short side length (z direction) of 0.2 μm, and a depth (the y direction in the drawings) of 0.05 μm was set at the center of a rectangular parallelepiped having a size of 20 μm in the x direction, 20 μm in the z direction, and 0.05 μm in the y direction and spaces having the same shape were periodically and infinitely repeated in the xy direction was assumed. Since the xy direction is a periodic boundary, calculation is performed for a model in which shielding spaces that are infinitely long in the y direction are infinitely arranged in the x direction at an interval of 20 μm. In this model, a refractive index distribution is constant in the depth direction (y direction). Therefore, when the refractive index distribution is calculated, the model may be considered as a two-dimensional model in the xz plane.

The following model was assumed as the two-dimensional (xz plane) model: a model in which a shielding space (shielding region) had a rectangular shape (x=2 μm and z=0.2 μm) and linear slits (the coordinates of the ends of the slits were ±2.1 (μm) in the z direction) were provided in the forward and backward directions of the light incident axis of the shielding space (the positive and negative directions of the z-axis having the center of the shielding space as the origin).

For the coordinate system including the shielding space and the slits, a conformal mapping function was calculated from the slits provided along the z-axis direction in a coordinate system in which the refractive index was uniform (here, n=1.465) by a charge simulation method. Then, a refractive index distribution in the coordinate system including the shielding space and the slits was calculated using the derivative of the conformal mapping function. Here, in the coordinate system including the shielding space and the slits, the slit is a line and does not have a width. Therefore, the slit is considered only when the conformal mapping function is calculated and is negligible when the refractive index distribution is calculated. Here, the average value of the refractive indices adjacent to the left and right sides of the x direction was used as the refractive index of a point on the slit. In addition, it was assumed that chrome having the same shape as the shielding space was provided in the shielding space and the optical constant of chrome was used as the optical constant of the shielding space.

(Evaluation of Cloaking Performance)

A numerical simulation using a finite-difference time-domain method (FDTD method) was applied to the refractive index distribution structure of the two-dimensional model obtained by the above-mentioned optical design. Periodic boundary conditions were used in the xy direction in a computational domain and the polarizing direction of light was the x direction.

1) Reflectance

The periodic boundary conditions were set in each of the x direction and the y direction. Light with a wavelength of 550 nm was propagated as incidence rays in the −z direction and the electric field amplitudes of incident waves and reflected waves after the convergence of a calculated value (electric field strength value) were calculated. Then, reflectance was calculated from the relative ratio of the electric field amplitude of the incident waves to the electric field amplitude of the reflected waves.

2) Observation of Wave Front

An electric field strength distribution was calculated at a certain point of time after the convergence of calculation and a variation in the wave front after light passed through the shielding space (target object) was observed.

Figure 9:
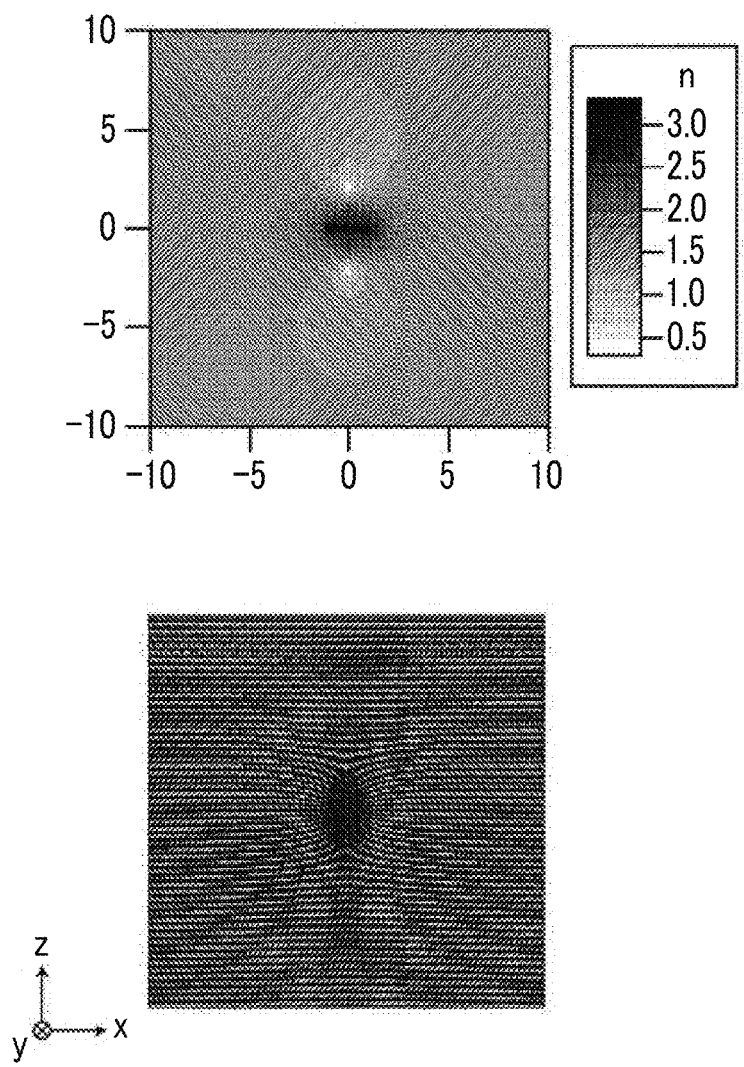
FIG. 9 is a diagram illustrating the simulation result of a refractive index distribution and a wave front in the xz cross-section of a cloaking structure according to Example 1.

The upper diagram of FIG. 9 illustrates a refractive index distribution in the xz plane in Example 1 and the lower diagram of FIG. 9 illustrates the wave front in the xz plane.

Comparative Example 1-1

A space model including the same shielding space as that according to Example 1 is set.

It was assumed that, in a two-dimensional model, a refractive index distribution structure was not provided and chrome having the same shape as the shielding space was provided in the shielding space. That is, a structure in which a chrome wire was provided in a region with a uniform refractive index (n=1.465) was assumed and a simulation was performed for reflectance and a wave front, similarly to Example 1.

Figure 10:
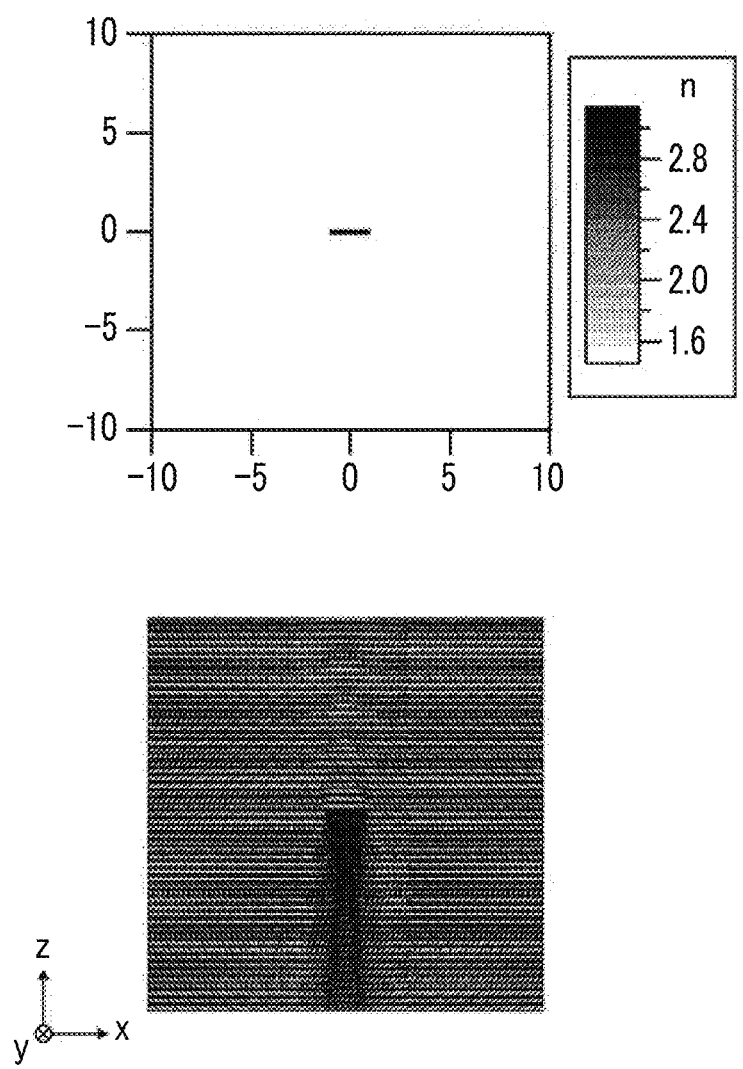
FIG. 10 is a diagram illustrating the simulation result of a refractive index distribution and a wave front in the xz cross-section of a cloaking structure according to Comparative Example 1-1.

The upper diagram of FIG. 10 illustrates a refractive index distribution in the xz plane in Comparative Example 1-1 and the lower diagram of FIG. 10 illustrates the wave front in the xz plane.

Comparative Example 1-2

A space model including the same shielding space as that according to Example 1 is set. That is, a model in which a shielding space with a rectangular parallelepiped shape having a long side length (x direction) of 2 μm, a short side length (z direction) of 0.2 μm, and a depth (the y direction in the drawings) of 0.05 μm is set at the center of a rectangular parallelepiped having a size of 20 μm in the x direction, 20 μm in the z direction, and 0.05 μm in the y direction and spaces having the same shape are periodically and infinitely repeated in the xy direction is set. Calculation is performed for a model in which shielding spaces that are infinitely long in the y direction are infinitely arranged in the x direction at an interval of 20 μm.

However, in the two-dimensional model, no slits were provided in the forward and backward directions (z direction) of the axis of light incident. For the coordinate system including only the shielding space, a conformal mapping function is calculated from the slits provided along the z-axis direction in a coordinate system in which the refractive index was uniform (n=1.465) by the charge simulation method and a refractive index distribution in the coordinate system including the shielding space was calculated, similarly to Example 1.

Figure 11:
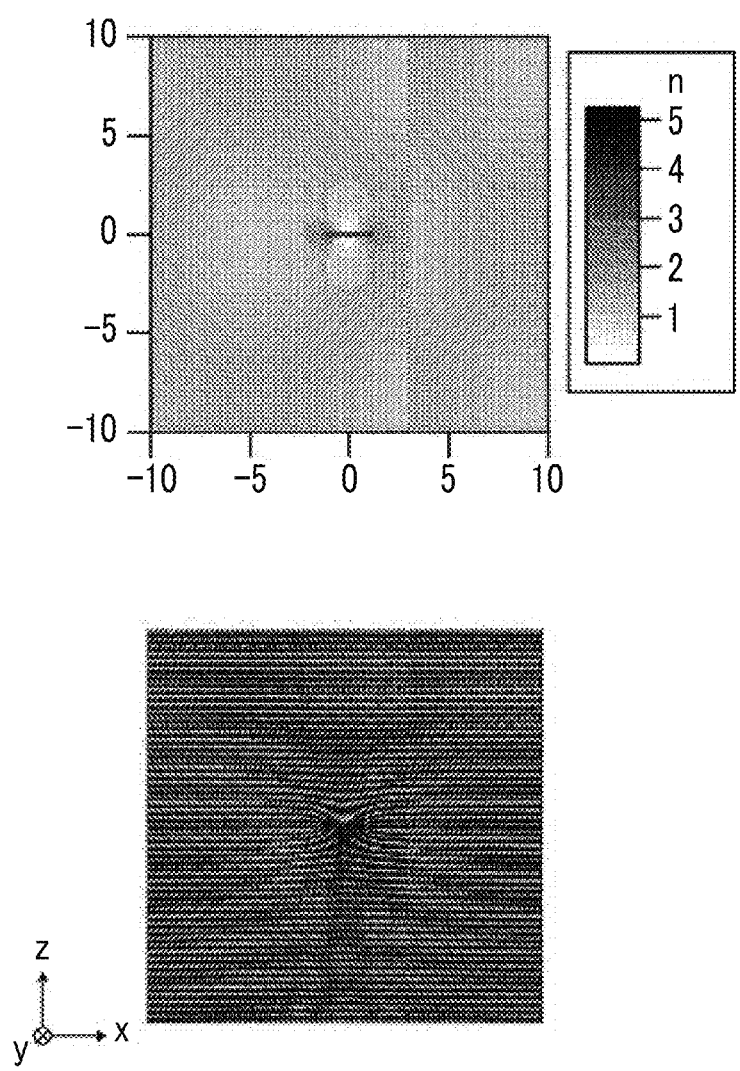
FIG. 11 is a diagram illustrating the simulation result of a refractive index distribution and a wave front in the xz cross-section of a cloaking structure according to Comparative Example 1-2.

The upper diagram of FIG. 11 illustrates a refractive index distribution in the xz plane in Comparative Example 1-2 and the lower diagram of FIG. 11 illustrates the wave front in the xz plane.

The following Table 1 illustrates the reflectances calculated by the simulations for Example 1, Comparative Example 1-1, and Comparative Example 1-2.

TABLE 1

|  | Example 1 | Comparative Example 1-1 | Comparative Example 1-2 |
| --- | --- | --- | --- |
| Reflectance (%) | 1.68 | 6.72 | 1.42 |

In Example 1 according to the invention, reflectance is less than that in Comparative Example 1-1. In addition, as can be seen from Table 1, disturbance in the wave front in the −z region after light passed through the shielding space in Example 1 illustrated in FIG. 9 was significantly less than disturbance in the wave front in the −z region after light passed through a target object (chrome wire) in Comparative Example 1-1 illustrated in FIG. 10. From this point of view, the optical design of the electromagnetic cloaking structure according to the invention was effective.

In Example 1 and Comparative Example 1-2, the reflectances are similar to each other. As can be seen from FIGS. 9 and 11, the aspect in which the wave front of electromagnetic waves travels around the shielding space (target object) is confirmed and the effect of preventing disturbance in the wave front is also obtained on the rear side of the target object. That is, it was found that the optical design in which only a high refractive index region was formed around the shielding space and a low refractive index region was formed at a position separated from the shielding space as in Example 1 had a high cloaking performance, similarly to Comparative Example 1-2. In the related art, there is a restriction that the high refractive index region and the low refractive index region need to be provided so as to be adjacent to the shielding space as in the refractive index distribution according to Comparative Example 1-2. However, the invention does not have the restriction. Therefore, it is possible to improve flexibility in manufacture.

Example 2

(Optical Structure Design)

In Example 2, an electromagnetic cloaking structure having the refractive index distribution described in the second embodiment which was disposed only on the incident side of electromagnetic waves with respect to the plane in which the incident direction of the electromagnetic waves on a target object to be shielded from the electromagnetic waves was a normal vector was examined.

First, a refractive index distribution was calculated using a space model that was the same as the space model according to Example 1 except that a shielding space had a rectangular parallelepiped shape with a long side length (x direction) of 2 μm, a short side length (z direction) of 0.4 μm, and a depth (the y direction in the drawings) of 0.05 μm.

That is, it was assumed that, in a two-dimensional model, a shielding space had a rectangular shape (the x direction: 2 μm, the z direction: 0.4 μm) and linear slits were provided in the forward and backward directions (z direction) of the light incident axis of the shielding space. For the shielding space and the slits, a conformal mapping function was numerically calculated from the slits provided along the z-axis direction in a coordinate system in which the refractive index was uniform (here, n=1). Then, a refractive index distribution in the coordinate system including the shielding space and the slits was calculated using the derivative of the conformal mapping function. Here, in the coordinate system including the shielding space and the slits, the slit is a line and does not have a width. Therefore, the slit is considered only when the conformal mapping function is calculated and is negligible when the refractive index distribution is calculated. Here, the average value of the refractive indices adjacent to the left and right sides of the x direction was used as the refractive index of a point on the slit. In addition, it was assumed that chrome having the same shape as the shielding space was provided in the shielding space and the optical constant of chrome was used as the optical constant of the shielding space. Then, the refractive index was constant (n=1.465) in a region in which z<0 was established.

(Evaluation of Cloaking Performance)

A cloaking performance was evaluated by the same method as that in Example 1.

Figure 12:
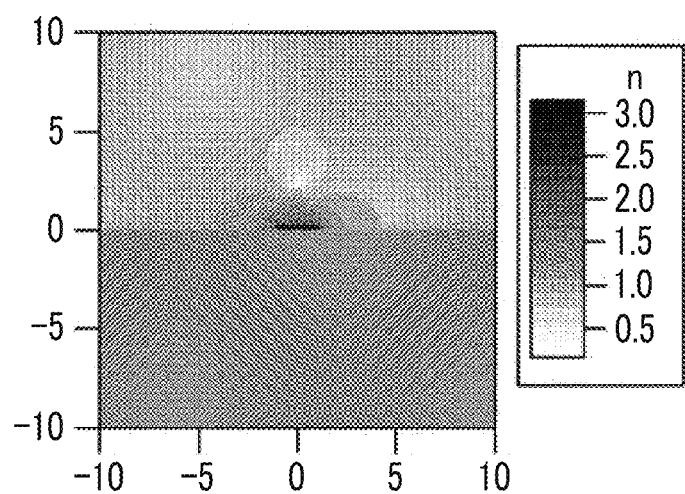
FIG. 12 is a diagram illustrating the simulation result of a refractive index distribution and a wave front in the xz cross-section of a cloaking structure according to Example 2.
Figure 12:
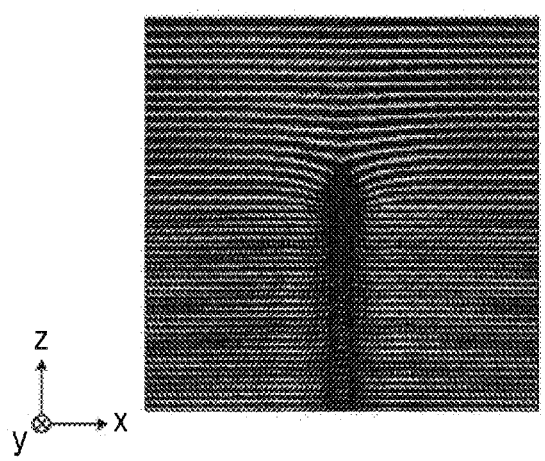

The upper diagram of FIG. 12 illustrates a refractive index distribution in the xz plane in Example 2 and the lower diagram of FIG. 12 illustrates the wave front in the xz plane.

Comparative Example 2-1

A structure including the same shielding space as that in Example 2 is assumed.

Here, it was assumed that, in a two-dimensional model, the refractive index was constant (n=1.465) in a region in which z<0 was established, was constant (n=1) in which z≥0 was established except for the shielding space, and chrome having the same shape as the shielding space was provided in the shielding space and a simulation for reflectance and the wave front was performed by the same method as that in Example 2.

Figure 13:
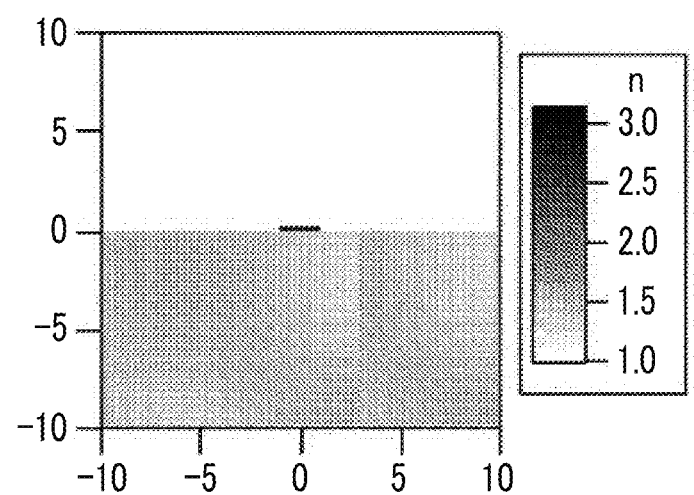
FIG. 13 is a diagram illustrating the simulation result of a refractive index distribution and a wave front in the xz cross-section of a cloaking structure according to Comparative Example 2-1.
Figure 13:
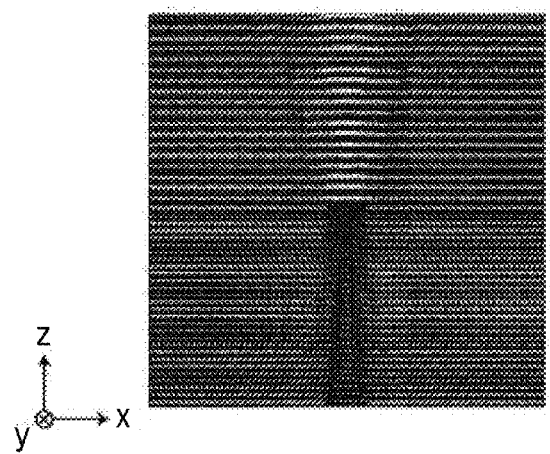

The upper diagram of FIG. 13 illustrates a refractive index distribution in the xz plane in Comparative Example 2-1 and the lower diagram of FIG. 13 illustrates the wave front in the xz plane.

Comparative Example 2-2

A space model including the same shielding space as that in Example 2 is set. However, it was assumed that, in the two-dimensional model, no slits were provided in the forward and backward directions (z direction) of the light incident axis. Comparative Example 2-2 was the same as Example 2 except that, for a coordinate system including only the shielding space, a conformal mapping function was calculated from the slits provided along the z-axis direction in a coordinate system in which the refractive index was uniform by the charge simulation method.

Figure 14:
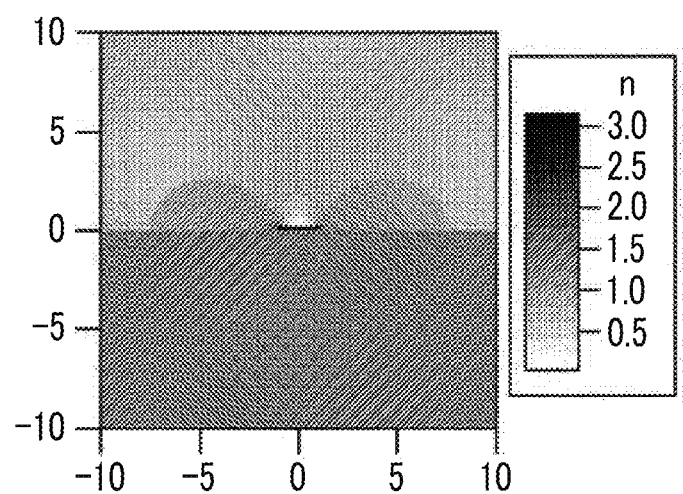
FIG. 14 is a diagram illustrating the simulation result of a refractive index distribution and a wave front in the xz cross-section of a cloaking structure according to Comparative Example 2-2.
Figure 14:
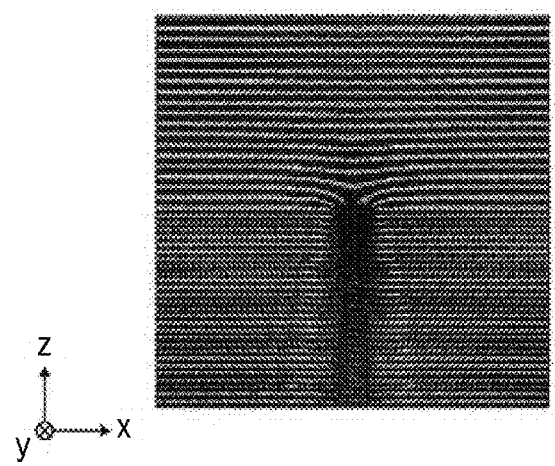

The upper diagram of FIG. 14 illustrates a refractive index distribution in the xz plane in Comparative Example 2-2 and the lower diagram of FIG. 14 illustrates the wave front in the xz plane.

The following Table 2 illustrates the reflectances calculated by the simulations in Example 2, Comparative Example 2-1, and Comparative Example 2-2.

TABLE 2

|  | Example 2 | Comparative Example 2-1 | Comparative Example 2-2 |
| --- | --- | --- | --- |
| Reflectance (%) | 3.27 | 11.8 | 4.06 |

In Example 2 according to the invention, reflectance is less than that in Comparative Example 2-1. From this point of view, the optical design of the electromagnetic cloaking structure according to the invention was effective.

The reflectances in Example 2 and Comparative Example 2-2 are substantially equal to each other. In FIGS. 12 and 14, the aspect in which the wave front of electromagnetic waves travels around the shielding space (target object) can be confirmed. Similarly to Example 1, it was found in Example 2 that the optical design in which only a high refractive index region was formed around the shielding space and a low refractive index region was formed at a position separated from the shielding space had a high cloaking performance, similarly to Comparative Example 2-2. In the related art, there is a restriction that the high refractive index region and the low refractive index region need to be provided so as to be adjacent to the shielding space as in the refractive index distribution according to Comparative Example 2-2. However, the invention does not have the restriction. Therefore, it is possible to improve flexibility in manufacture.

INDUSTRIAL APPLICABILITY

The electromagnetic cloaking structure according to the invention can be applied to a technique that makes an object invisible and stealth technology.

What is claimed is:

1. An electromagnetic cloaking structure that includes a shielding space for accommodating a target object to be shielded from electromagnetic waves and has a refractive index distribution around the shielding space,
   wherein an entire medium including a base medium which forms the structure has an isotropic refractive index, and
   in a case where an average of a maximum value and a minimum value in the refractive index distribution is an average refractive index, the refractive index distribution has a high refractive index region with a relatively high refractive index which is provided around the shielding space and has the maximum value in a plane surrounding the shielding space and in which the refractive index decreases gradually from a centroid of the shielding space along a radial line passing through the plane so as to be close to the average refractive index and a low refractive index region with a relatively low refractive index which has the minimum value at two points having the shielding space and the high refractive index region interposed therebetween on one virtual optical axis or two different virtual optical axes passing through the shielding space and in which the refractive index increases gradually from the two points in a direction opposite to the high refractive index region on the virtual optical axes, on which the two points are placed, so as to be close to the average refractive index.

2. The electromagnetic cloaking structure according to claim 1,
   wherein the two points are placed on the same virtual optical axis passing through the centroid of the shielding space.

3. The electromagnetic cloaking structure according to claim 2,
   wherein a rate of addition of at least one medium, which has a refractive index different from that of the base medium, to the base medium is modulated to form the refractive index distribution.

4. The electromagnetic cloaking structure according to claim 3,
   wherein the at least one medium is added as a structure with a size that is equal to or less than half of a wavelength of the electromagnetic waves to the base medium, and
   in the refractive index distribution, the size of the structures which are periodically arranged in the base medium at an interval that is equal to or less than half of the wavelength of the electromagnetic waves is changed, depending on an arrangement position, to modulate the rate of addition.

5. The electromagnetic cloaking structure according to claim 3, wherein the at least one medium is added as a structure with a size that is equal to or less than half of a wavelength of the electromagnetic waves to the base medium, and in the refractive index distribution, the density of the structures arranged in the base medium is changed to modulate the rate of addition.

6. The electromagnetic cloaking structure according to claim 1, wherein a rate of addition of at least one medium, which has a refractive index different from that of the base medium, to the base medium is modulated to form the refractive index distribution.

7. The electromagnetic cloaking structure according to claim 6, wherein the at least one medium is added as a structure with a size that is equal to or less than half of a wavelength of the electromagnetic waves to the base medium, and in the refractive index distribution, the size of the structures which are periodically arranged in the base medium at an interval that is equal to or less than half of the wavelength of the electromagnetic waves is changed, depending on an arrangement position, to modulate the rate of addition.

8. The electromagnetic cloaking structure according to claim 6, wherein the at least one medium is added as a structure with a size that is equal to or less than half of a wavelength of the electromagnetic waves to the base medium, and in the refractive index distribution, the density of the structures arranged in the base medium is changed to modulate the rate of addition.

9. An electromagnetic cloaking structure having a refractive index distribution that is disposed only on an incident side of electromagnetic waves with respect to a plane in which an incident direction of the electromagnetic waves on a target object to be shielded from the electromagnetic waves is a normal vector, wherein an entire medium including a base medium which forms the structure has an isotropic refractive index, and in a case where an average of a maximum value and a minimum value in the refractive index distribution is an average refractive index, the refractive index distribution comprises a region which has the maximum value in an outermost surface on the side of the target object to be shielded, a high refractive index region with a relatively high refractive index in which the refractive index gradually decreases from a center of the outermost surface of the region having the maximum value along a radial line so as to be close to the average refractive index and a low refractive index region with a relatively low refractive index which has the minimum value on an incident side of the electromagnetic waves on the high refractive index region and in which the refractive index increases gradually toward the incident side so as to be close to the average refractive index.

10. The electromagnetic cloaking structure according to claim 9, wherein a rate of addition of at least one medium, which has a refractive index different from that of the base medium, to the base medium is modulated to form the refractive index distribution.

11. The electromagnetic cloaking structure according to claim 10, wherein the at least one medium is added as a structure with a size that is equal to or less than half of a wavelength of the electromagnetic waves to the base medium, and in the refractive index distribution, the size of the structures which are periodically arranged in the base medium at an interval that is equal to or less than half of the wavelength of the electromagnetic waves is changed, depending on an arrangement position, to modulate the rate of addition.

12. The electromagnetic cloaking structure according to claim 10, wherein the at least one medium is added as a structure with a size that is equal to or less than half of a wavelength of the electromagnetic waves to the base medium, and in the refractive index distribution, the density of the structures arranged in the base medium is changed to modulate the rate of addition.

13. A method for manufacturing an electromagnetic cloaking structure, comprising:

determining a shape of a shielding space;

assuming that an incident direction of electromagnetic waves on the shielding space is a z-axis direction, a centroid of the shielding space is the origin of the shielding space, and slits are provided in a positive region and a negative region of the z-axis direction passing through the origin; and acquiring a conformal mapping function for coordinate conversion from an original coordinate system in which a refractive index distribution has been known to a coordinate system including the shielding space and the slits;

calculating a refractive index distribution in the coordinate system including the shielding space from the refractive index distribution of the original coordinate system and a derivative of the conformal mapping function; and manufacturing the electromagnetic cloaking structure that includes the shielding space and has the refractive index distribution around the shielding space.

* * * * *